United States Patent
Shibata et al.

(10) Patent No.: US 6,765,754 B2
(45) Date of Patent: Jul. 20, 2004

(54) FLEXIBLE DISK DRIVE COMPRISING AN INDEX DETECTION HALL ELEMENT HAVING AN IMPROVED DETECTION SENSITIVE CONDITION OF A MAGNETIC FIELD

(75) Inventors: Akira Shibata, Murayama (JP); Yoshihito Otomo, Tendo (JP)

(73) Assignee: Mitsumi Electric Co. Ltd., Tokyo (JP)

( * ) Notice: Subject to any disclaimer, the term of this patent is extended or adjusted under 35 U.S.C. 154(b) by 126 days.

(21) Appl. No.: 10/179,872

(22) Filed: Jun. 25, 2002

(65) Prior Publication Data

US 2003/0002208 A1 Jan. 2, 2003

(30) Foreign Application Priority Data

Jun. 27, 2001 (JP) .......................................... 2001-194072
Mar. 27, 2002 (JP) .......................................... 2002-087624

(51) Int. Cl.[7] .......................... G11B 25/04; G11B 19/20; G11B 33/12
(52) U.S. Cl. .................................................. 360/99.04
(58) Field of Search ........................... 360/99.04, 99.08, 360/98.07; 310/67 R

(56) References Cited

U.S. PATENT DOCUMENTS 4,806,813 A * 2/1989 Sumi et al. ................ 310/68 R
5,254,895 A * 10/1993 Koizumi ................... 360/98.07
5,796,204 A * 8/1998 Woo .......................... 310/67 R

FOREIGN PATENT DOCUMENTS

JP         05002822 A * 1/1993    ........... G11B/19/06
JP       2001-178185 A   6/2001
JP       2001-190055 A   7/2001

* cited by examiner

Primary Examiner—Craig A. Renner
(74) Attorney, Agent, or Firm—Frishauf, Holtz, Goodman & Chick, P.C.

(57) ABSTRACT

A motor rotatably driving a flexible disk has a rotor having an external peripheral side surface on which an index detection magnet is mounted. A main circuit board mounts a control circuit for carrying out a driving control of the motor and extends in a direction perpendicular to a rotation axis of the motor. Attached to the main circuit board, a sub circuit board extends in a direction in parallel with the rotation axis of the motor at a position close to the external peripheral side surface of the rotor. Mounted on the sub circuit board, an index detection Hall element has a magnetic field detection surface which is disposed so as to oppose to the external peripheral side surface of the rotor.

4 Claims, 9 Drawing Sheets

FLEXIBLE DISK DRIVE COMPRISING AN INDEX DETECTION HALL ELEMENT HAVING AN IMPROVED DETECTION SENSITIVE CONDITION OF A MAGNETIC FIELD

BACKGROUND OF THE INVENTION

This invention relates to a flexible disk drive for carrying out data recording and reproducing operations to and from a rotating disk-shaped magnetic recording medium of a flexible disk and, in particular, to an arrangement structure for a Hall element for generating an index signal.

In the manner which is well known in the art, the flexible disk drives (which may be hereinafter called "FDDs" for short) of this type are devices for carrying out data recording and reproducing operations to and from disk-shaped magnetic recording media of the flexible disks (which may be hereinafter called "FDs" for short) loaded therein. In addition, such flexible disk drives are widely mounted or loaded in electronic devices such as a personal computer, a work station, a word processor, or the like.

Loaded in the flexible disk drive, the flexible disk is rotated by a motor. An index signal is used to determine a starting position of the rotating flexible disk. That is, the index signal is a pulse signal that is generated each time the disk-shaped magnetic recording medium in the flexible disk makes one revolution. For example, the index signal is used for generation of a "Ready" signal in the FDD. The "Ready" signal is a signal for notifying the system that writing/reading can be prepared and is generated by detecting that the disk-shaped magnetic recording medium or the motor is rotated by means of the index signal. In the system, the index signal is referred on starting of writing on track formatting, and the index signal is used for determining a point for stopping after one revolution. The index signal is used for management of processing time on writing and on reading. For example, a predetermined count is preliminarily defined and processing is made as an error if the processing for a designated sector is not carried out until counting the number of pulses of the index signal up to the predetermined count on writing/reading.

In order to generate such as an index signal, in an FDD for driving an FD of 5.25 inch type (which will be hereinafter called "FDD of 5.25 inch type"), an index hole bored in a flexible disk is used. More specifically, generation of the index hole was carried out by irradiating light beam through the index hole bored in a jacket or a cartridge and by detecting presence of the index hole by the light beam.

On the other hand, in an FDD for driving an FD of 3.5 inch type (Which will be hereinafter called (FDD of 3.5 inch type) which becomes presently mainstream, there is no index hole in the flexible disk. In the FDD of 3.5 inch type, driving of the flexible disk is carried out by rotating a driving pin projecting from a disk table (chucking table) toward the flexible disk. It is therefore possible to rotatably position among the disk table, a rotor of the motor, and the flexible disk. As a result, it is possible to detect rotation of the flexible disk by looking over rotation of the disk table or the rotor.

In particular, in a flexible disk drive where a DD (direct-drive) motor such as a spindle motor is used for rotatably driving the flexible disk, the index signal is generated on the basis of operation in periphery of a rotor of the DD motor. More specifically, a notch portion is partially provided with a peripheral side surface of a disk-shaped casing composing the rotor while a magnet is disposed inside the casing so that only one magnetic pole (e.g. a north pole) is visible via the notch portion. Such a magnet is called an index detection magnet. In addition, on a main frame on which a stator of the DD motor and so on are mounted, a main printed wiring board on which a predetermined circuit is formed is disposed. A Hall element is located on the main printed wiring board at a predetermined position corresponding to the outside of the rotor. The Hall element is called an index detection Hall element.

Herein, the Hall element is a semiconductor element applying a Hall effect. The Hall element is a phenomenon where an electric field occurs in a conductor in a y-direction perpendicular to both of an x-direction and a z-direction when the electric current flows in the x-direction in the conductor and when the magnetic field is applied to the z-direction perpendicular to the x-direction. The electric field caused thereby is a Hall electric field and an output of the Hall element in response thereto is a Hall output.

In addition, Hall elements are used not only as the index detection Hall element but also for detecting a position in the rotor of the spindle motor. Such Hall elements are called position detection Hall elements. A spindle motor using the position detection Hall elements is called a Hall motor.

In the manner which is described above, in prior art, a single-pole magnetized magnet is used as the index detection magnet. It is difficult to obtain a stable generation timing for the index signal. Accordingly, in order to obtain the stable generation timing for the index signal, the co-inventors of the present invention have already proposed and filed an application to use, as the index detection magnet, a double-pole magnetized magnet (that is, one where a south pole and a north pole are put side by side) (see Japanese Unexamined Patent Publication Tokkai No. 2001-190,055 or JP-A 2001-190055).

In addition, the index detection magnet mounted on the rotor and the index detection Hall element located on the printed wiring board are disposed so that they are apart from each other at a magnetic field detection position by a little distance. The printed wiring board is disposed so as to extend in a direction normal to a rotation axis of the spindle motor. Accordingly, a conventional index detection Hall element necessarily has a magnetic detection surface which is disposed to extend in parallel with a direction of the magnetic field generated by the index detection magnet. Therefore, the conventional index detection Hall element is disadvantageous in that it has a poor sensitive condition for the magnetic field.

On the other hand, in order to improve the sensitive condition for the magnetic field, it may be devised to use, as the index detection Hall element, a specific Hall element having a magnetic field detection surface extending in a lateral direction (namely, at a side surface instead of an upper surface) thereof. However, inasmuch as the specific Hall element is not generally commercially available and is a specific and rare one, it is disadvantageous in that cost rises.

SUMMARY OF THE INVENTION

It is therefore an object of the present invention to provide a flexible disk drive which is provided with an index detection Hall element having an improved detection sensitive condition for a magnetic field.

Other objects of this invention will become clear as the description proceeds.

On describing the gist of an aspect of this invention, it is possible to be understood that a flexible disk drive comprises a main frame in which a flexible disk is inserted. The main frame has a frame main surface and a frame back surface. Mounted on the frame main surface of the main frame, a motor rotatably drives the flexible disk inserted in the main frame. The motor has a rotation axis. The motor comprises a rotor rotatably disposed around the rotation axis and a stator combined with the rotor. The rotor has an external peripheral side surface on which an index detection magnet is mounted. Mounted on the frame back surface of the main frame, a circuit board mounts a control circuit for carrying out a driving control of the motor thereon. According to the aspect of this invention, the above-understood circuit board comprises a main circuit board for mounting the control circuit thereon and for extending in a direction perpendicular to the rotation axis of the motor and a sub circuit board mounted to said main circuit board at a position close to the external peripheral side surface of the rotor so as to extend in a direction in parallel with the rotation axis of the motor. Attached on the sub circuit board, an index detection Hall element has a magnetic field detection surface which is disposed so as to oppose to the external peripheral side surface of the rotor.

In the above-mentioned flexible disk drive, the sub circuit board has a board main surface opposed to the rotor and a board back surface opposite to the board main surface. The sub circuit board may have a penetration for penetrating between the board main surface and the board back surface. In this event, the index detection Hall element may preferably be inserted in the penetration so that the magnetic field detection surface is faced to the board main surface of the sub circuit board. The main circuit board may have an edge close to the rotor. In this event, the sub circuit board may desirably be attached to the main circuit board at the edge of the main circuit board. The board back surface of the sub circuit board may serve as a soldering surface. In this event, the sub circuit board and the main circuit board may preferably be soldered with each other at the soldering surface with the board back surface of the sub circuit board and the edge of the main circuit board in contact with each other. The index detection Hall element may have terminals electrically connected to the soldering surface.

DESCRIPTION OF THE PREFERRED EMBODIMENT

Figure 1:
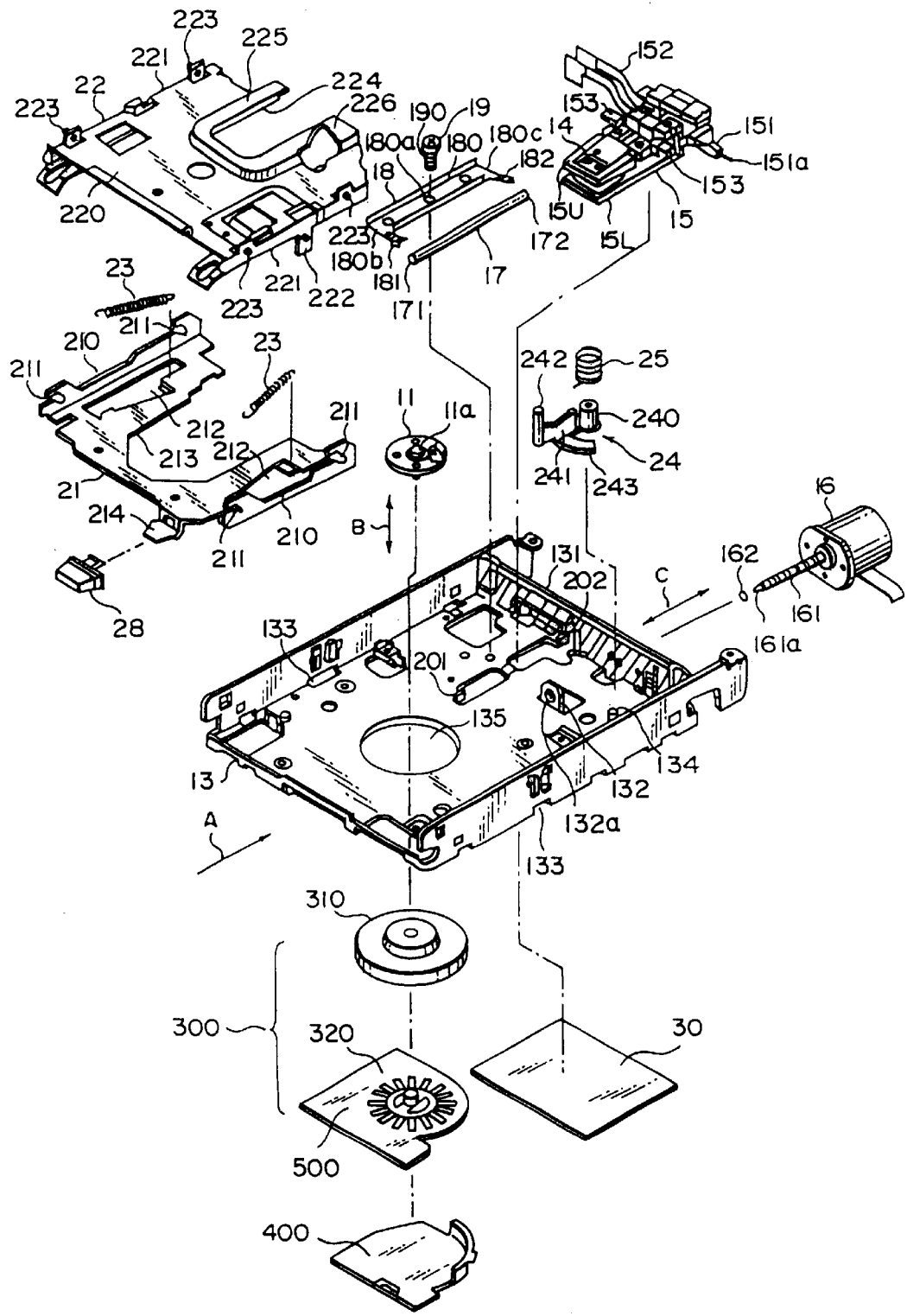
FIG. 1 is an exploded perspective view showing a main part of a conventional flexible disk drive.
Figure 2:
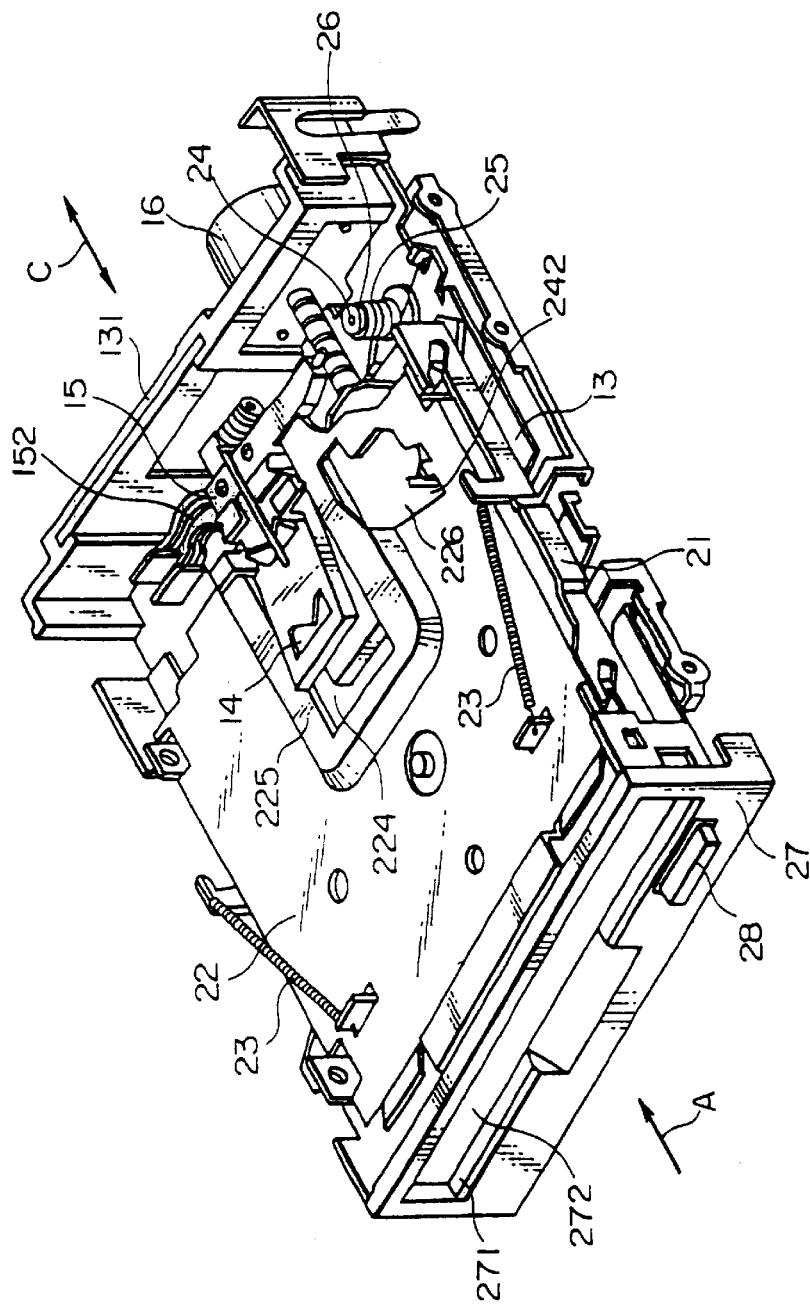
FIG. 2 is a schematic perspective view of the flexible disk drive illustrated in FIG. 1.

Referring to FIGS. 1 and 2, a conventional flexible disk drive of a 3.5-inch type will be described at first in order to facilitate an understanding of the present invention. FIG. 1 is an exploded perspective view of the conventional flexible disk drive. Although the conventional flexible disk drive has a front panel and a case, they are omitted in FIG. 1. FIG. 2 is a schematic perspective view of the conventional flexible disk drive viewing from a front side. The case is omitted in FIG. 2.

The illustrated flexible disk drive is a device for driving a flexible disk of a 3.5-inch type (not shown). The flexible disk is loaded or inserted in the flexible disk drive from a direction indicated by an arrow A in FIGS. 1 and 2. The loaded flexible disk is held on a disk table 11 having a rotation axis 11a. In this event, the rotation axis 11a coincides with a center axis of the flexible disk. In the manner which will later be described, the disk table 11 is rotatably supported on a frame main surface of the main frame 13. Accordingly, the rotation axis 11a of the disk table 11 has an axial direction B which extends in parallel with a thick direction of the main frame 13. The disk table 11 is rotatably driven by a spindle motor or a direct-drive (DD) motor 300, which is mounted on a frame back surface of the main frame 13, thereby a magnetic recording medium of the flexible disk rotates. In addition, on the frame back surface of the main frame 13 is attached a main printed wiring board 30 on which a number of electronic parts (not shown) are mounted. Among the electronic parts, a control circuit carries out a driving control of the spindle motor 300.

The flexible disk drive comprises a pair of upper and lower magnetic heads 14 (only the upper magnetic head is illustrated) for reading/writing data from/to the magnetic recording medium of the flexible disk. The magnetic heads 14 are supported in a carriage assembly 15 at a tip thereof that is laid in the flexible disk drive at a rear side. That is, the carriage assembly 15 comprises an upper carriage 15U for supporting the upper magnetic head 14 and a lower carriage 15L for supporting the lower magnetic head. The carriage assembly 15 is disposed over the frame main surface of the main frame 13 and is apart from the main frame 13 in the manner which will later be described. The carriage assembly 15 supports the magnetic heads 14 at the tip thereof movably along a predetermined radial direction (i.e. a direction indicated by an arrow C in FIGS. 1 and 2) to the flexible disk.

In addition, the main frame 13 has at the rear side a side wall 131 on which a stepping motor 16 is fixed. The stepping motor 16 linearly drives the carriage assembly 15 along the predetermined radial direction C. More specifically, the stepping motor 16 has an axis of rotation (a driving shaft) 161 which extends in parallel with the predetermined radial direction C and which is threaded to form a male screw. The driving shaft 161 has a tip 161a which penetrates a hole 132a bored in a bent piece 132 and which is provided with a steel ball 162. The bent piece 132 is raised from the frame main surface of the main frame 13 by cutting and bending. By the hole 132a and the steel ball 162, a position of the driving shaft 161 is defined so as to extend in parallel with the predetermined radial direction C and the tip 161a is rotatably held.

On the other hand, the carriage assembly 15 comprises an arm 151 which extends from the lower carriage 15L to the driving shaft 161. The arm 151 has a leading edge 151a which is bent so as engage with the root in the male screw of the driving shaft 161. Therefore, when the driving shaft 161 of the stepping motor 16 rotates, the leading edge 151a of the arm 151 moves along the root in the male screw of the driving shaft 161, thereby moving the carriage assembly 15 along the predetermined radial direction C. At any rate, the stepping motor 16 serves as a driving arrangement for linearly moving the carriage assembly 15 along the predetermined radial direction C.

Inasmuch as the driving shaft 161 of the stepping motor 16 is disposed at one side of the carriage assembly 15, the one side of the carriage assembly 15 is movably supported by the driving shaft 161 and is apart from the main surface of the main frame 13. However, because support occurs by the driving shaft 161, it is difficult to dispose the whole of the carriage assembly 15 apart from the frame main surface of the main frame 13. For this purpose, it is necessary to support and guide the carriage assembly 15 at another side thereof. To guide the carriage assembly 15 is a guide bar 17. That is, the guide bar 17 is opposed to the driving shaft 17 of the stepping motor 16 with the carriage assembly 15 inserted between the guide bar 17 and the driving shaft 161. The guide bar 17 extends in parallel with the predetermined radial direction C and has one end 171 and another end 172 which are mounted on the frame main surface of the main frame 13 in the manner which later be described. The guide bar 17 guides the carriage assembly 15 along the predetermined radial direction C. As a result, the whole of the carriage assembly 15 is disposed apart from the frame main surface of the main frame 13.

In addition, a flexible printed circuit (FPC) 152 extends from the carriage assembly 15 to the vicinity of the guide bar 17 and the flexible printed circuit 152 are electrically connected to the main printed wiring board 30 attached to the back surface of the main frame 13.

The guide bar 17 is clamped on the frame main surface of the main frame 13 by a guide bar clamp 18. The guide bar clamp 18 is fixed on the frame main surface of the main frame 13 at a center portion thereof by a binding small screw 19. More specifically, the guide bar clamp 18 comprises a rectangular fixed member 180 having a length longer than that of the guide bar 17 by a short distance. In about the center of the rectangular fixed member 180, a hole 180a is drilled through which a screw shaft 190 of the binding small screw 19 passes. The rectangular fixed member 180 has one end 180b and another end 180c from which a pair of arms 181 and 182 extend to clamp the one end 171 and the other end 172 of the guide bar 17, respectively, with the guide bar 17 sandwiched between the arms 181 and 182

Inasmuch as the guide bar clamp 18 merely clamps the guide bar 17, the guide bar 17 cannot be fixed on the frame main surface of the main frame 13 by the guide bar clamp 18 alone. For this purpose, a pair of locating members for locating the both ends 171 and 172 of the guide bar 17 is needed. As the pair of locating members, a pair of bent pieces 201 and 202 are used which are formed at the side of the frame main surface of the main frame 13 by cutting and bending parts of the main frame 13. At any rate, the pair of bent pieces 201 and 202 locates both ends 171 and 172 of the guide bar 17 to mount the guide bar 17 on the frame main surface of the main frame 13 in cooperation with the guide bar clamp 18.

The lower carriage 15L of the carriage assembly 15 serves as a supporting frame for supporting the carriage assembly 15 slidably along the guide bar 17. The lower carriage 15L has a projecting portion (not shown) which projects into the frame main surface of the main frame 13 at a side of the guide bar 17. The guide bar 17 is slidably fitted in the projection portion.

The flexible disk drive further comprises an eject plate 21 and a disk holder 22. Each of the main frame 13, the eject plate 21, and the disk holder 22 is formed to perform bending, press working, and bending of a metal plate.

The eject plate 21 is mounted on the frame main surface of the main frame 13 slidably along the insertion direction A of the floppy disk and an opposite direction. In the manner which will later become clear, the eject plate 21 holds, in cooperation with the disk holder 22, the flexible disk on operating of the flexible disk drive. In addition, the eject plate 21 holds the flexible disk slidably along the insertion direction A so as to allow the flexible disk drive to load the flexible disk therein along the insertion direction A and to allow the flexible disk drive to eject the flexible disk therefrom along the opposite direction. The eject plate 21 comprises a pair of side walls 210 which are opposed to each other. Each of the side walls 210 has a pair of cam portions 211. In addition, the eject plate 21 has a bottom surface on which cut portions 212 are formed along the both side walls 210 and a U-shaped cut portion 213 is formed at a center portion thereof so as to enclose the disk table 11. Furthermore, the eject plate 21 has a back surface on which a pin (not shown) is formed. The pin engages with a stop part of an eject lever which will later be described.

The disk holder 22 is disposed on the eject plate 21. The disk holder 22 comprises a principal surface 220 and a pair of side walls 221 which is formed at both side ends of the principal surface 220 and which is opposed to each other. The both side walls 221 have projection pieces 222 (only one is illustrated). The projection pieces 222 are inserted in bores 133 of the main frame 13 through the cut portions 212 of the eject plate 21. Inasmuch as the projection pieces 222 are inserted in the bores 133 of the main frame 13, the disk holder 22 is positioned against the main frame 13 in the insertion direction A and the disk holder 22 is reciprocated in the axial direction B of the rotation axis 11a of the disk table 11. Each of the both side walls 221 has a pair of pins 223. The pins 223 are inserted in the cam portions 211 formed in the side walls 210 of the eject plate 21. Between the disk holder 22 and the eject plate 21, eject springs 23 bridge.

Although the disk holder 22 is provided with the projection pieces 222 and the bores 133 are formed in the main frame 13 in this example, restriction is not made to this and the main frame 13 may be provided with projection pieces and bores may be formed in the disk holder 22.

In addition, the disk holder 22 has a rectangular opening section 224 at a center portion in a back side in the insertion direction A. The rectangular opening section 224 is laid in a corresponding position of the upper carriage 15U of the carriage assembly 15 and extends in the predetermined radial direction C. So as to enclose the opening section 224, a U-shaped swelled portion 225 is formed where the principal surface 220 of the disk holder swells at periphery upwards. On the other hand, the carriage assembly 15 comprises a pair of side arms 153 which extends in a lateral direction perpendicular to a longitudinal direction of the carriage assembly 15. The side arms 153 are located on or over the swelled portion 225. In the manner which will later be described, in a state where the floppy disk is ejected from the disk holder 22, the side arms 153 engages with the swelled portion 225, thereby the pair of upper and lower magnetic heads 14 are apart from each other. In addition, the disk holder 22 has an additional opening section 226 at a right-hand side of the opening section 224 in the back side of the insertion direction A. The opening section 226 has a shape so as to allow a lever part of the eject lever (which will later be described) rotatably move.

In the vicinity of the carriage assembly 15 on the main frame 13, the eject lever depicted at 24 is formed to rotatably move. More specifically, on the main frame 13, a rod pin 134 stands up which extends from the frame main surface thereof upwards. The eject lever 24 comprises a cylindrical part 240 in which the rod pin 134 is inserted, an arm part (the lever part) 241 extending from the cylindrical part 240 in a radial direction, a projection part 242 which is formed in the arm part 241 at a free end thereof and which extends upwards, and an arc-shaped stop part 243 which extends from a side of the free end of the arm part 241 in a circumferential direction. In the eject lever 24, an eject lever spring 25 is attached around the cylindrical part 240 and the eject lever spring 25 urges the eject lever 24 in a counter-clockwise direction on a paper of FIG. 1. The projection part 242 of the eject lever 24 is freely fitted in the opening section 226 of the disk holder 22. The projection part 242 is engaged with an upper end of a right-hand side edge of a shutter in the flexible disk to control opening and shutting of the shutter. In addition, as shown in FIG. 2, a screw 26 is thrust into a tip of the rod pin 134, thereby preventing the eject lever 24 from falling off the rod pin 134.

In addition, the main frame 13 has a front end section on which a front panel 27 is attached. The front panel 27 has an opening 271 for taking the flexible disk in and out and a door 272 for opening and shutting the opening 271. Into the front panel 27, an eject button 28 projects movably backward and forward. The eject button 28 is fitted in a protrusion part 214 which protrudes from a front end of the eject plate 21 forwards.

Figure 3:
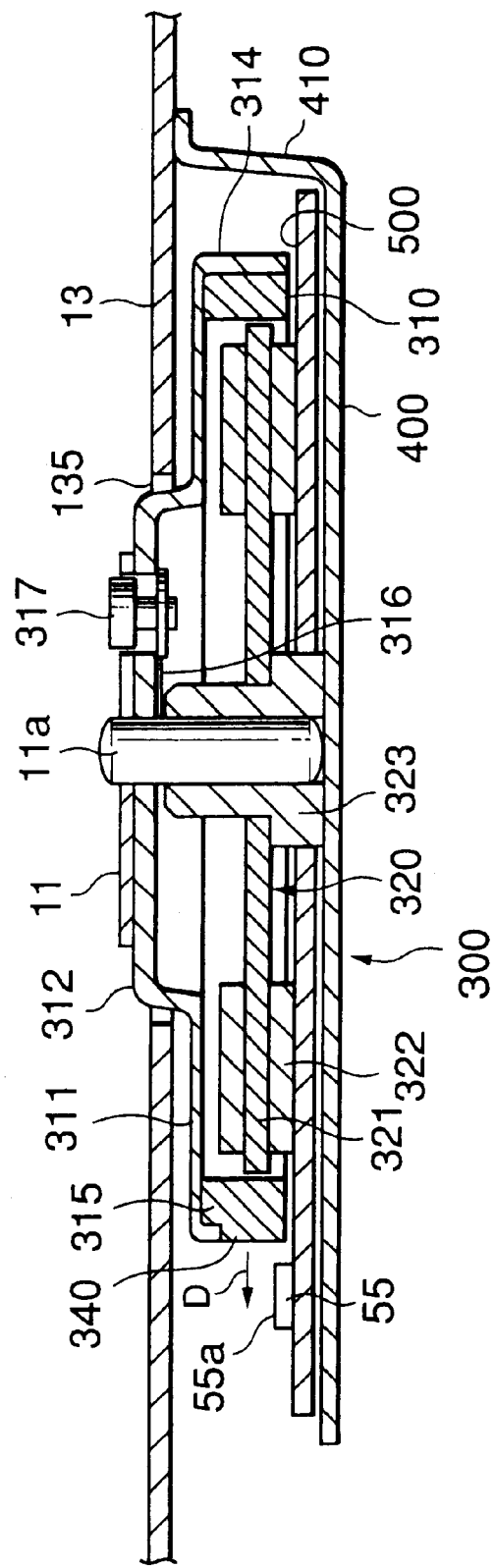
FIG. 3 is a sectional view showing a relationship between a main frame and a direct-drive motor (spindle motor) mounted thereon in the flexible disk drive illustrated in FIG. 1.

Referring now to FIG. 3, the description will proceed to the spindle motor (DD motor) 300 for use in the above-mentioned flexible disk drive.

The illustrated DD motor 300 comprises a rotor 310 and a stator 320 combined with the rotor 310. The rotor 310 comprises a disk-shaped metallic casing 311 which has a protruding portion 312 formed at its center to protrude upward. The protruding portion 312 has an upper surface on which the above-mentioned disk table 11 is mounted. The main frame 13 has a circular opening 135 which allows only an upper part of the protruding portion 312 to pass therethrough and project on the frame main surface of the main frame 13. As a result, the disk table 11 is projected on the frame main surface of the main frame 13.

The rotation axis or shaft 11a made of metal is integrally fixed to the rotor 310 at the center thereof to pass through the casing 311 and the disk table 11. When the disk table 11 is injection-molded by the use of a plastic magnet, the casing 311 and the rotation shaft 11a are integrally assembled. The casing 311 has a cylindrical member 314 formed on its outer periphery to extend downward. A ring-shaped permanent magnet 315 is attached to an inner surface of the cylindrical member 314.

The permanent magnet 315 has a plurality of main magnetized elements along a circumferential direction thereof. In addition, the permanent magnet 315 has a bottom portion which has a plurality of motor-servo magnetized elements along a circumferential direction thereof. When the later-mentioned stator 320 has fifteen poles, the main magnetized elements are equal in number to twenty (that is, north poles N are equal in number to ten and south poles S are equal in number to ten). On the other hand, the motor-servo magnetized elements are equal to one hundred and twenty (that is, north poles N are equal in number to sixty and south poles S are equal in number to sixty) independently of the number of the poles of the stator 320. The main magnetized elements are called driving magnetized portions while the motor-servo magnetized elements are called detection magnetized portions.

In addition, as shown in FIG. 3, the cylindrical member 314 or an external peripheral side wall of the casing 311 has a notch portion formed by cutting a part of the external peripheral side wall. A part of the main magnetized elements protrudes from the notch portion and is exposed as a magnetic pole 340. The exposed magnetic pole 340 is operable as the above-mentioned index detection magnet.

The protruding portion 312 is provided with an arm 316 attached to a bottom surface thereof. A drive roller 317 is rotatably mounted on the arm 316. Each of the protruding portion 312 and the disk table 11 has a generally rectangular hole (not shown) formed therein. Through these holes, the drive roller 317 projects upward from the disk table 11. The flexible disk received in the flexible disk drive is placed on the disk table 11. The drive roller 317 is inserted in and engaged with a hole (not shown) formed in a hub (not shown) of the flexible disk. Thus, the magnetic disk medium of the flexible disk is rotated following the rotation of the rotor 310.

On the other hand, the stator 320 is attached to the frame back surface of the main frame 13 by means of a motor frame 400 made of metal. More specifically, the stator 320 is formed on a printed wiring board 500 mounted on the principal surface of the metallic motor frame 400. The stator 320 comprises a core assembly having a plurality of stator cores 321, a plurality of stator coils 322, and a center metal (bearing unit) 323. Each of the stator core 321 extends radially outwardly from an outer periphery of a ring-shaped member of the center metal 323. Each of stator coils 322 is wound around an end portion of each corresponding stator core 321. The center metal 323 is formed at the center of the printed wiring board 500 and rotatably supports the rotation shaft 11a. The motor frame 400 has a plurality of attaching elements 410 of an inverted-L shape which extend upward from a peripheral edge of the motor frame 400 to abut against the frame back surface of the main frame 13.

Figure 4:
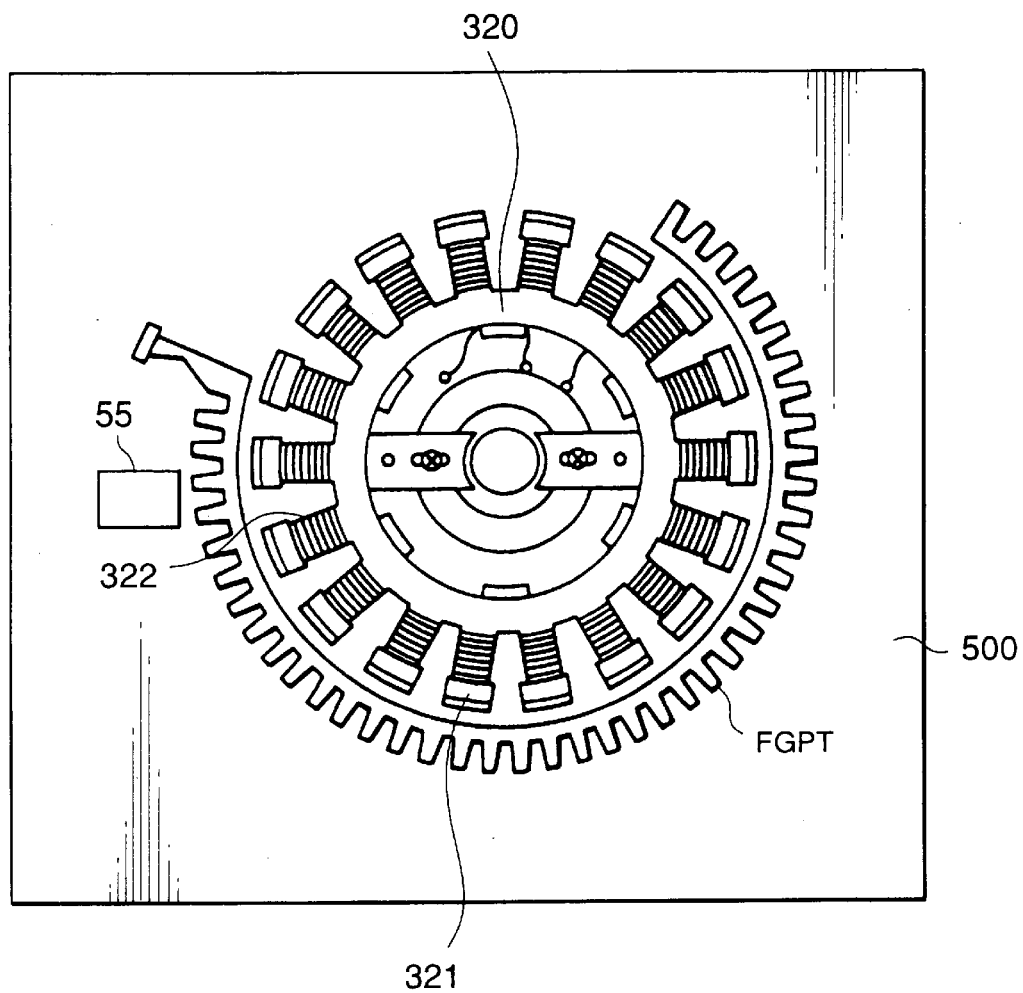
FIG. 4 is a plan view for use in describing a structure of a stator in the direct-drive motor illustrated in FIG. 3.

As shown in FIG. 4, on the printed wiring board 500, a frequency generation pattern FGPT is formed around the stator 320 of the DD motor 300. In other words, the frequency generation pattern FGPT is arranged to oppose to the motor-servo magnetized elements (detection magnetized portions) of the permanent magnet 315 (FIG. 3) such that a predetermined gap is formed distance left therebetween. In addition, FIG. 4 illustrates a case where the stator 320 has eighteen poles. That is, the stator cores 321 (or the stator coils 322) of the stator 320 are equal in number to eighteen. In this event, the rotor 310 (FIG. 3) has the main magnetized elements which are equal in number to twenty-four. In this connection, as described above, when the stator 320 has fifteen poles, the rotor 310 has the main magnetized elements which are equal to twenty.

When the motor-servo magnetized elements of the permanent magnet 315 rotate over the frequency generation pattern FGPT, a counterelectromotive force generates in the frequency generation pattern FGPT. Inasmuch as the motor-servo magnetized elements of the permanent magnet 315 are equal in number to one hundred and twenty for a round, a signal of sixty cycles generates from the frequency generation pattern FGPT when the DD motor 300 makes one rotation. This signal is called an FG servo signal. When the number of revolutions of the DD motor 300 is equal to 300 RPM, the DD motor 300 makes five rotations per second. In this event, the FG servo signal has a frequency of (60×5) or 300 Hz.

Accordingly, it is possible to control the rotation speed of the DD motor 300 by comparing the FG servo signal with a divided clock signal having a divided clock frequency of 300 Hz which is obtained by frequency dividing a reference clock signal having a reference clock frequency of 1 MHz by using a counter. In other words, a speed control of the DD motor 300 is carried out by starting the counter in synchronism with a leading edge timing of the FG servo signal and by comparing a trailing edge timing of the FG servo signal with a trailing edge timing of the divided clock signal which is obtained by counting a fixed value in the counter. More specifically, if the trailing edge timing of the FG serve signal is earlier than the trailing edge timing of the divided clock signal, the DD motor 300 is controlled so as to decelerate the rotation speed of the DD motor 300. Conversely, if the trailing edge timing of the FG serve signal is later than the trailing edge timing of the divided clock signal, the DD motor 300 is controlled so as to accelerate the rotation speed of the DD motor 300.

As described above, the conventional flexible disk drive requires the printed wiring board 500 in order to compose the DD motor 300. In addition, the conventional flexible disk drive further requires the motor frame 400 made of metal like the main frame 13 to support the DD motor 300 on the side of the frame back surface of the main frame 13. In the conventional flexible disk drive, it is easy to electrically connect the printed wiring board 500 with the main printed board 30 if they are arranged adjacent to each other.

As shown in FIGS. 3 and 4, on the printed wiring board 500, an index detection Hall element 55 is disposed. The index detection Hall element 55 and the above-mentioned index detection magnet 340 are arranged with they apart from each other by a little distance at a magnetic field detection position as shown in FIG. 3. As shown in FIG. 3, the printed wiring board 500 is disposed on the motor frame 400 so as to extend perpendicular to the rotation axis 11a of the spindle motor 300. As a result, the index detection Hall element 55 is necessarily disposed on the printed wiring board 500 so that a magnetic field detection surface 55a thereof extends in parallel with a direction D of a magnetic field generated from the index detection magnet 340 (i.e. a radial direction in regard to the rotation axis 11a of the spindle motor 30 in FIG. 3). This is because, structurally, the index detection Hall element 55 is generally disposed (mounted) on the printed wiring board 500 so that the magnetic field detection surface 55a always extends in parallel with a main surface of the printed wiring board 500 on which the index detection Hall element 55 is mounted. In other words, a generally commercially available Hall element has a magnetic field detection surface so that normal to the magnetic field detection surface extends perpendicular to a mounting surface thereof.

As described above, in the conventional flexible disk drive, the direction D of the magnetic field generated from the index detection magnet 340 and the normal to the magnetic field detection surface 55a of the index detection Hall element 55 are perpendicular to each other. As a result, the conventional flexible disk drive is disadvantageous in that the index detection Hall element 55 has a poor detection sensitive condition of the magnetic field.

Figure 5:
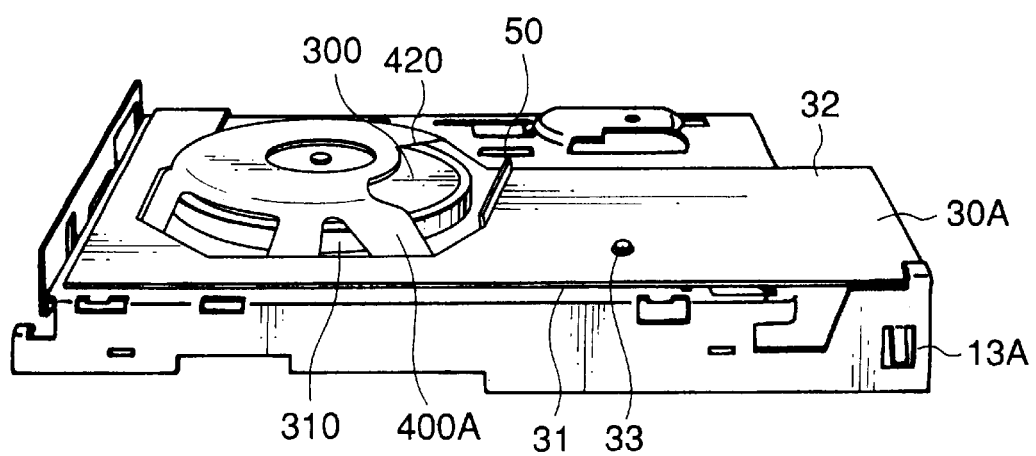
FIG. 5 is a schematic perspective view of a state where a main printed wiring board and a sub printed wiring board are mounted on a main frame for use in an embodiment of this invention as seen from the obliquely lower lateral side.

Referring to FIG. 5, the description will proceed to a frame structure of a main frame 13A for use in a flexible disk drive according to an embodiment of this invention. FIG. 5 is a schematic perspective view of the main frame 13A as viewed obliquely from a lower side.

In the manner as apparent from FIG. 5, the illustrated main frame (frame structure) 13A is composed of one piece in which the main frame 13A and a motor frame part 400A are integrated. The flexible disk is inserted or loaded in the main frame 13A. The spindle motor 300 (FIG. 3) for rotatably driving the inserted flexible disk is mounted on the motor frame part 400A. That is, the main frame 13A serves both as an original main frame (i.e. the main frame 13 of FIG. 1) and an original motor frame (i.e. the motor frame 400 of FIG. 1).

The motor frame part 400A has a drawn-shape obtained by drawing the main frame 13A. The motor frame part 400A protrudes into the back side of the main frame 13A to form a top surface which is a part of the frame back surface of the main frame 13A. In the top surface of the motor frame part 400A, an opening window 420 for drawing out leads of the spindle motor 300 is formed.

In addition, although the drawn-shape of the motor frame part 400A is a circular shape, it is not restricted to this and may be a polygonal shape or an oval shape in response to depth or material of the motor frame part 400A. In addition, a drawing shirked shape in the drawn-shape of the motor frame part 400A is also not restricted to that illustrated in FIG. 5 and may be various shapes. Furthermore, a connection way between the motor frame part 400A and the main frame 13A is also not restricted to that illustrated in FIG. 5.

The flexible disk drive according to the embodiment of this invention can adopt the main frame 13A having the above-mentioned shape because the flexible disk drive does not have the frequency generation pattern FGPT (FIG. 4) and the printed wiring board 500 which are necessary to control the spindle motor 300. Moreover, the motor-servo magnetized members formed at the bottom portion of the permanent magnet 315 of the rotor 310 are unnecessary because the flexible disk drive does not have the frequency generation pattern FGPT. Instead, the flexible disk drive comprises an electronic processing unit which functions as the combination of the frequency generation pattern FGPT and the motor-servo magnetized members. Operation of the electronic processing unit is similar to that described in Japanese Unexamined Patent Publication Tokkai No. 2001-178,185 or JP-A 2001-178185 which is already proposed by the present co-inventors. Inasmuch as the electronic processing unit only indirectly relates to this invention, the description thereof is omitted herein.

The flexible disk drive according to the embodiment of this invention comprises a main printed wiring board (a main circuit board) 30A which is attached to the frame back surface of the main frame 13A like the conventional flexible disk drive. The main printed wiring board 30A has a shape such as to avoid overlapping with the motor frame part 400A. The main frame 13A has a supporting piece (not shown) which is raised from the frame back surface of the main frame 13A by cutting and bending and which has a threaded hole formed in its tip portion. The main printed wiring board 30A is fixed to the supporting piece by a screw 33 engaged with the threaded hole so that a main surface 31 of the main printed wiring board 30A is spaced at a predetermined distance from the back surface of the main frame 13A and a back surface 32 of the main printed wiring board 30A is nearer to the frame back surface of the main frame 13A than the top surface of the motor frame part 400A.

Figure 6:
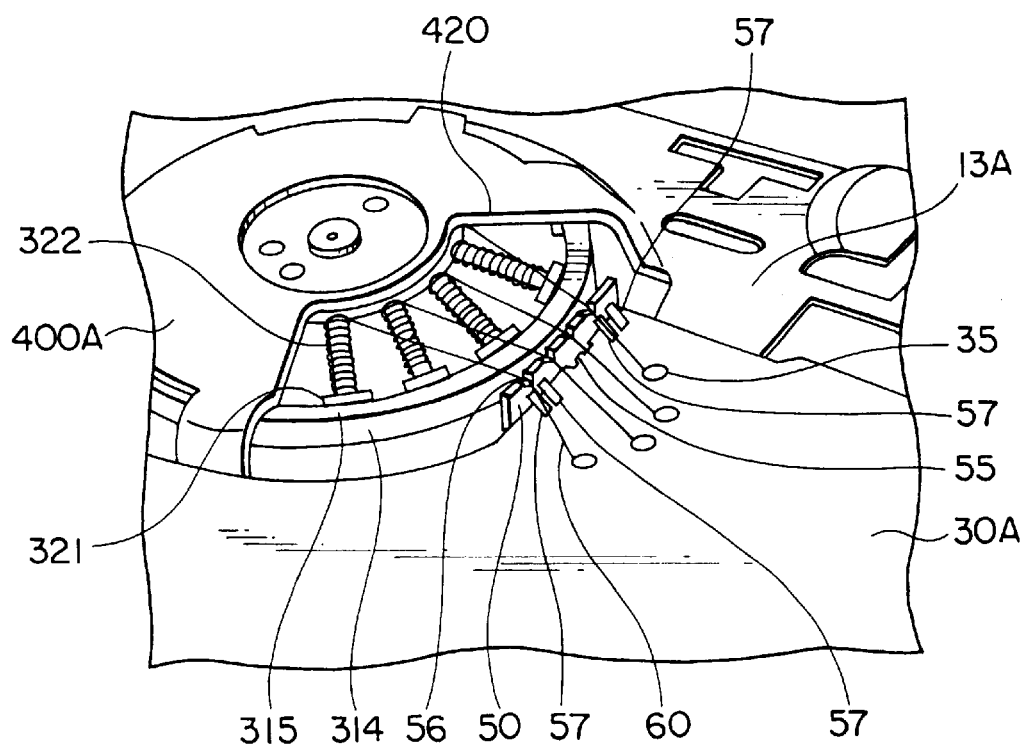
FIG. 6 is a view showing a state where leads are put on ditches of the sub printed wiring board illustrated in FIG. 5.

As shown in FIG. 6, on the side of the frame main surface of the main frame 13A, end portions (i.e. leads) of rotor coils wound around stator cores of the spindle motor mounted on the motor frame part 400A are drawn out to the back side of the main frame 13A through the opening window 420 formed in the main frame 13A and are connected to predetermined terminals on the main printed wiring board 30A. Generally, the leads 60 are equal in number to four. Three of the leads 60 correspond to U, V and W phases of three phase alternating current. The remaining one of the leads 60 is connected to the other ends of the leads for the U, V and W phases.

Figure 9:
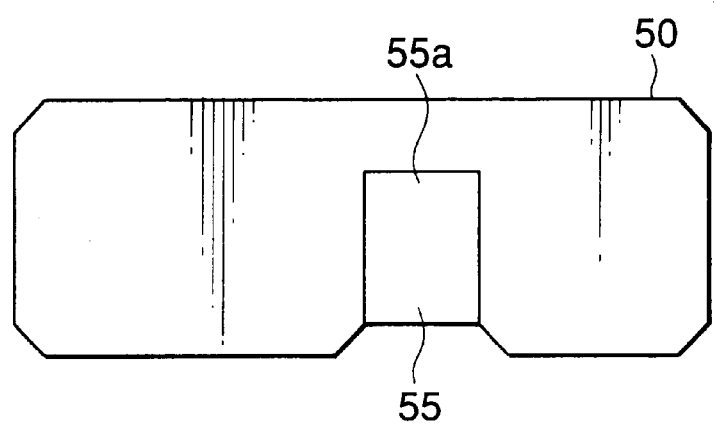
FIG. 9 is a plan view showing an external form of the sub printed wiring board on which the index detection Hall element illustrated in FIG. 7 is mounted.

The flexible disk drive according to the embodiment of this invention further comprises a sub printed wiring board (a sub circuit board) 50 as illustrated in FIG. 9. The sub printed wiring board 50 is for guiding the leads 60. On the sub printed wiring board 50, the index detection Hall element 55 is mounted in the manner which will later be described.

The main printed wiring board 30A extends in a direction perpendicular to the rotation axis 11a of the spindle motor 300. On the other hand, the sub printed wiring board 50 is attached to the main printed wiring board 30A at a position close to an external peripheral side surface of the rotor 310 of the spindle motor 300 so as to extend in a direction in parallel with the rotation axis 11a of the spindle motor 300.

Figure 7:
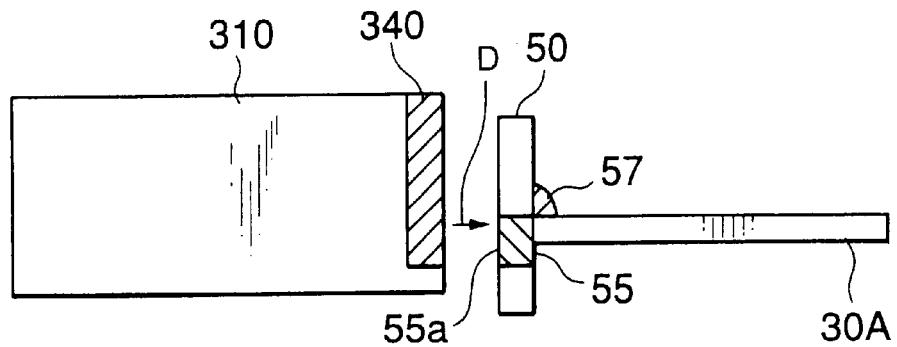
FIG. 7 is a view showing an arrangement relationship between an index detection magnet attached to a rotor and an index detection Hall element mounted on the sub printed wiring board.
Figure 8:
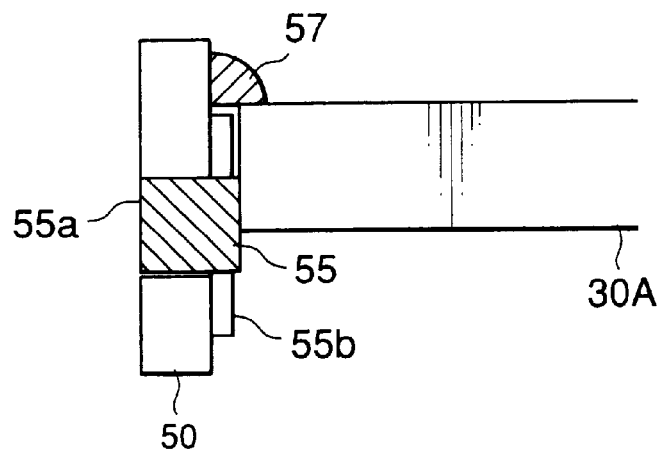
FIG. 8 is a view showing a state where the main printed wiring board and the sub printed wiring board on which the index detection Hall element illustrated in FIG. 7 are attached to each other.

As shown in FIG. 7, the index detection Hall element 55 is attached on the sub printed wiring board 50 so that a magnetic field detection surface 55a thereof is opposed to the external peripheral side surface of the rotor 310. In addition, the index detection Hall element 55 has four terminals 55b which are electrically connected to wiring (not shown) on the main printed wiring board 30A via solder 57. The solder 57 plays not only a role of such an electrically connection but also a role of a mechanical connection between the main printed wiring board 30A and the sub printed wiring board 50.

Drawn out from the opening window 420, the leads 60 are held and fixed on the sub printed wiring board 50 with the leads 60 put on ditches 56 of the sub printed wiring board 50. The leads 60 have tips which are connected and fixed to the predetermined terminals 35 of the sub printed wiring board 30A.

In the manner which is described above, according to this invention, a generally commercially available Hall element is used as the index detection Hall element 55 and the index detection Hall element 55 is mounted on the sub printed wiring board 50 so that the magnetic field detection surface 55a is opposed to the index detection magnet 340. Accordingly, it is possible to improve the detection sensitive condition of the magnetic field in the Hall element 55. Inasmuch as a specific Hall element having a magnetic field detection surface at a side surface thereof is not used as the index detection Hall element, costs are reduced.

Figure 10:
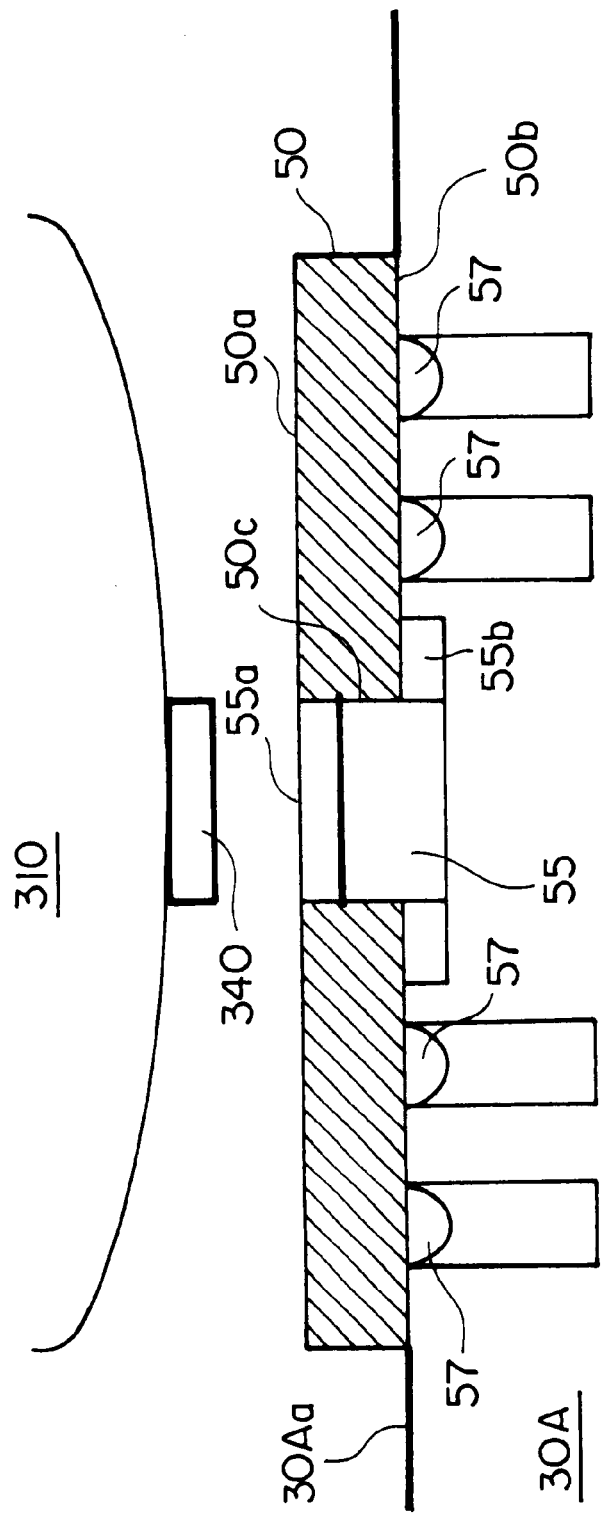
FIG. 10 is a cross section showing an arrangement relationship of an index detection Hall element according to this invention in detailed.

Referring to FIG. 10, the description will be made as regards arrangement of the index detection Hall element 55 according to this invention.

The sub circuit board 50 has a board main surface 50a opposed to the rotor 310 and a board back surface 50b opposite to the board main surface 50a. The sub circuit board 50 has a penetration 50c for penetrating between the board main surface 50a and the board back surface 50b. The index detection Hall element 55 is inserted in the penetration 50c so that the magnetic field detection surface 55a is faced to the board main surface 50a of the sub circuit board 50.

On the other hand, the main circuit board 30A has an edge 30A a close to the rotor 310. The sub circuit board 50 is attached to the main circuit board 30A at the edge 30Aa of the main circuit board 30A. The board back surface 50b of the sub circuit board 50 serves as a soldering surface. The sub circuit board 50 and the main circuit board 30A are soldered with each other at the soldering surface 50b with the back surface 50b of the sub circuit board 50 and the edge 30Aa of the main circuit board 30A in contact with each other. The four terminals 55b of the index detection Hall element 55 are electrically connected to the soldering surface 50b.

While this invention has thus far been described in conjunction with a preferred embodiment thereof, it is to be understood that modifications will be apparent to those skilled in the art without departing from the sprit of the invention.

What is claimed is:

1. A flexible disk drive comprising:

a main frame in which a flexible disk is inserted, said main frame having a frame main surface and a frame back surface;

a motor, mounted on the frame main surface of said main frame, for rotatably driving said flexible disk inserted in said main frame, said motor having a rotation axis, said motor comprising a rotor rotatably disposed around the rotation axis and a stator combined with said rotor, said rotor having an external peripheral side surface on which an index detection magnet is mounted;

a circuit board, mounted on the frame back surface of said main frame, for mounting a control circuit for carrying out a driving control of said motor thereon, said circuit board comprising a main circuit board for mounting said control circuit thereon and for extending in a direction perpendicular to the rotation axis of said motor and a sub circuit board attached to said main circuit board at a position close to the external peripheral side surface of said rotor so as to extend in a direction in parallel with the rotation axis of said motor; and an index detection Hall element mounted to said sub circuit board, said index detection Hall element having a magnetic field detection surface which is disposed so as to oppose to the external peripheral side surface of said rotor.

2. A flexible disk drive as claimed in claim 1, wherein said sub circuit board has a board main surface opposed to said rotor and a board back surface opposite to said board main surface, said sub circuit board having a penetration for penetrating between the board main surface and the board back surface, said index detection Hall element being inserted in said penetration so that the magnetic field detection surface is faced to the board main surface of said sub circuit board.

3. A flexible disk drive as claimed in claim 2, wherein said main circuit board has an edge close to said rotor, said sub circuit board being attached to said main circuit board at the edge of said main circuit board.

4. A flexible disk drive as claimed in claim 3, wherein the board back surface of said sub circuit board serves as a soldering surface, said sub circuit board and said main circuit board being soldered with each other at the soldering surface with the board back surface of said sub circuit board and the edge of said main circuit board in contact with each other, said index detection Hall element having terminals electrically connected to the soldering surface.

* * * * *